Nov. 2, 1948.                G. D. MOODY                2,452,859
              DEODORIZING AND STEAM CONDENSING DEVICE
Filed Jan. 5, 1946                              3 Sheets-Sheet 1
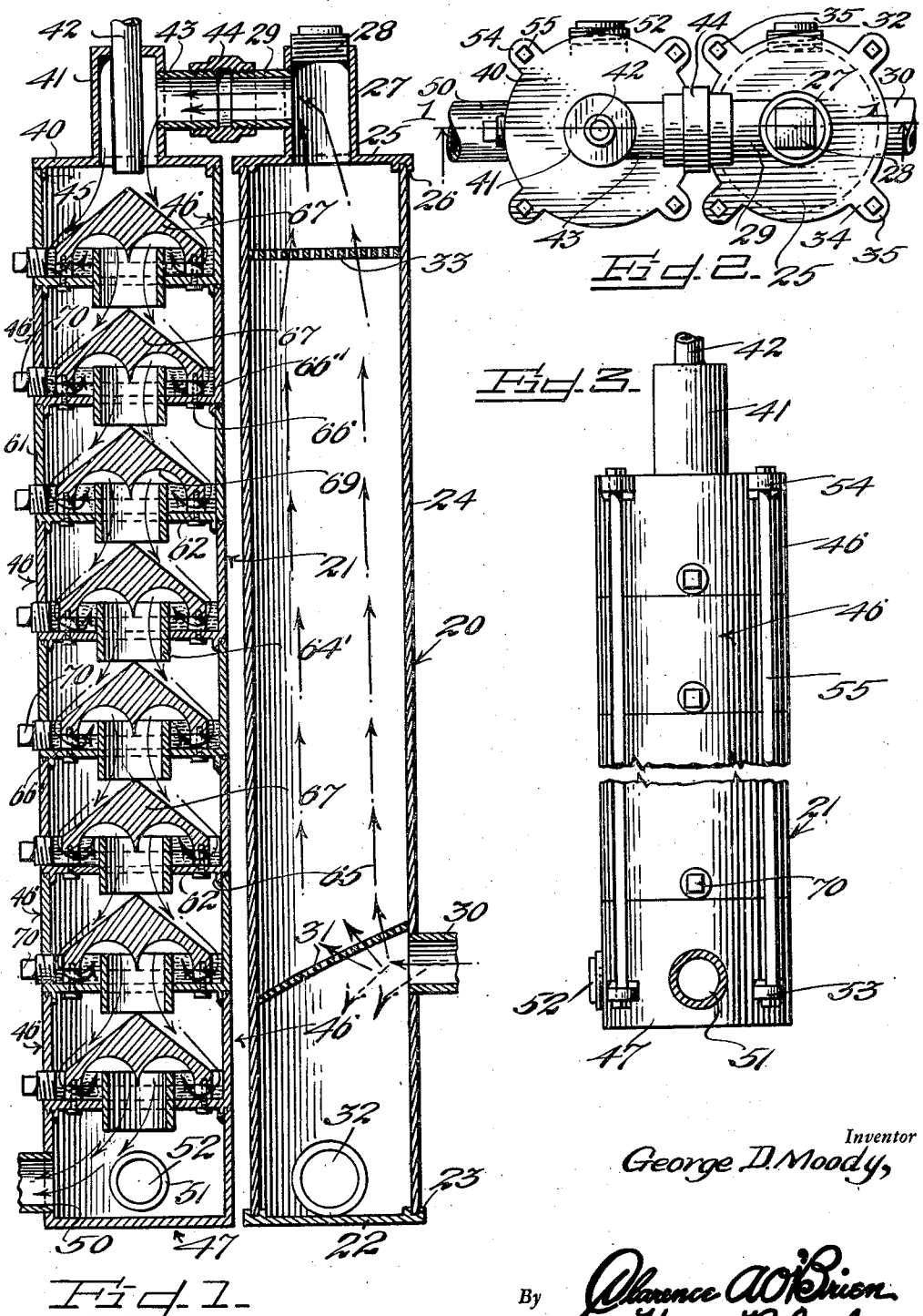
Inventor
George D. Moody,
By Clarence A. O'Brien
and Harvey B. Jacobson
Attorneys Nov. 2, 1948.　　　G. D. MOODY　　　2,452,859
DEODORIZING AND STEAM CONDENSING DEVICE
Filed Jan. 5, 1946　　　3 Sheets-Sheet 2
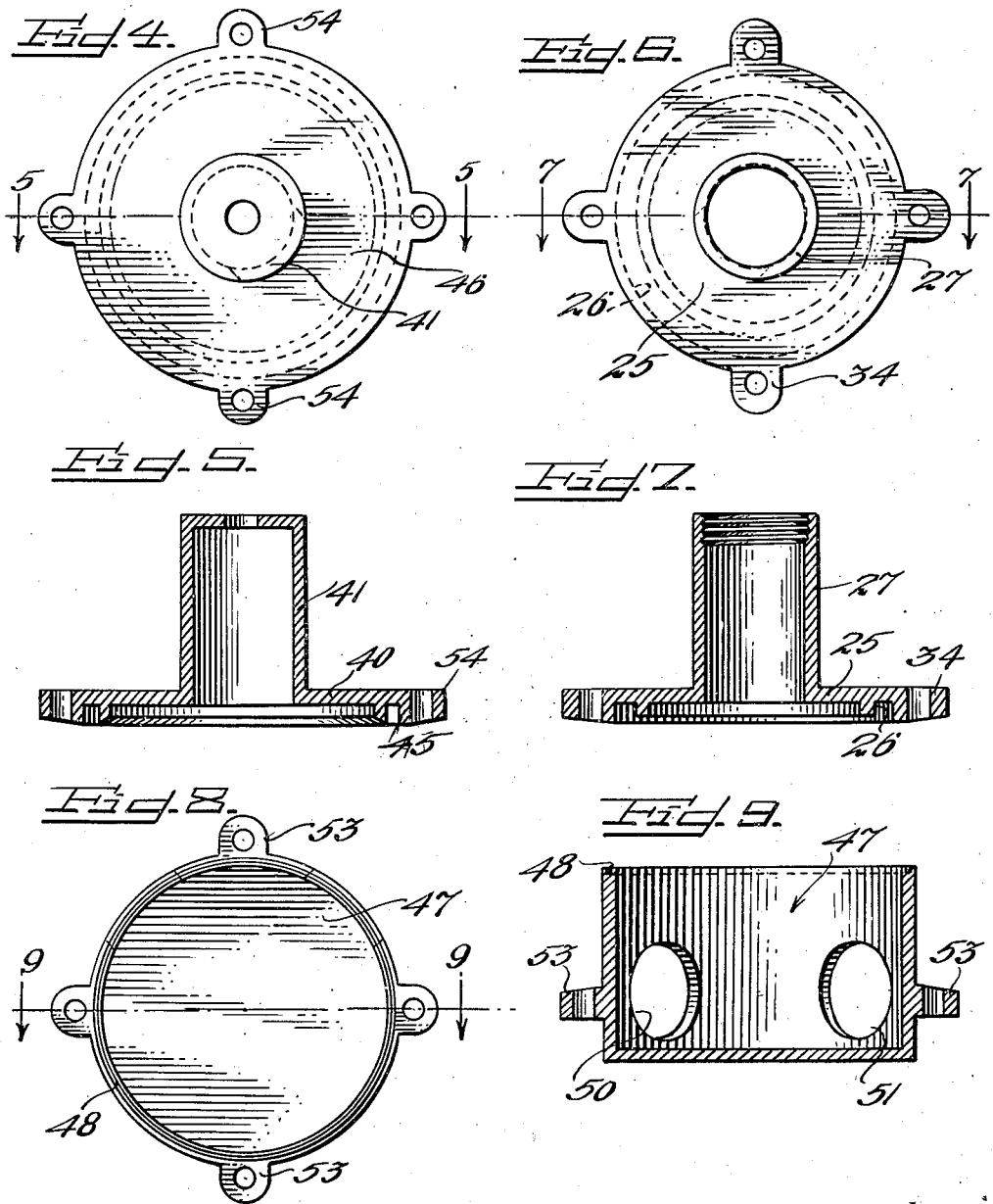
Inventor
George D. Moody,
By Clarence A. O'Brien
and Harvey B. Jacobson
Attorneys Nov. 2, 1948.    G. D. MOODY    2,452,859
DEODORIZING AND STEAM CONDENSING DEVICE
Filed Jan. 5, 1946    3 Sheets-Sheet 3
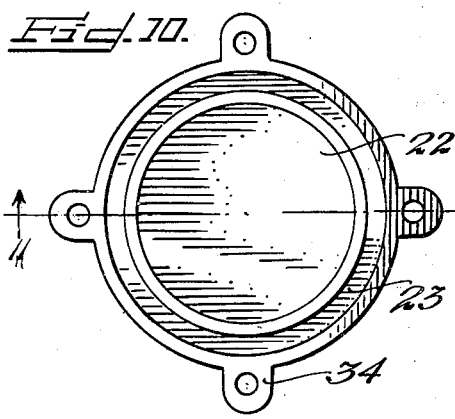
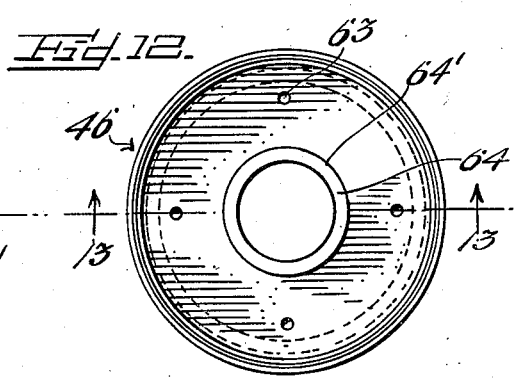
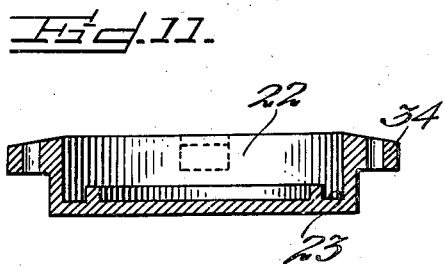
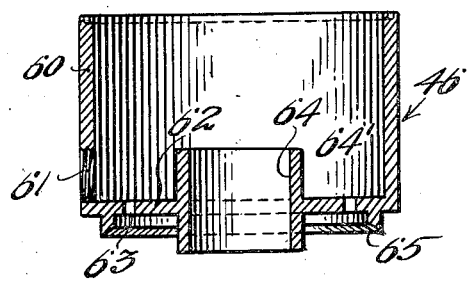
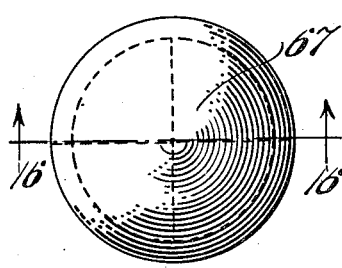
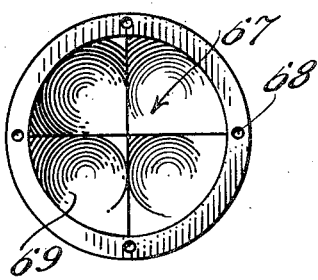
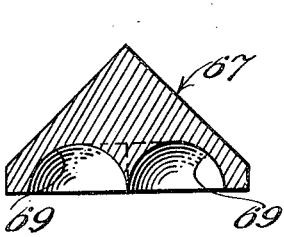
Inventor
George D. Moody,
By Clarence A. O'Brien
and Harvey B. Jacobson
Attorneys Patented Nov. 2, 1948

2,452,859

UNITED STATES PATENT OFFICE 2,452,859

DEODORIZING AND STEAM CONDENSING DEVICE

George D. Moody, Arkansas City, Kans., assignor of one-third to Ralph E. Moody, Arkansas City, Kans.

Application January 5, 1946, Serial No. 639,190

3 Claims. (Cl. 183—17)

This invention relates to improvements in deodorizing and steam condensing devices for use particularly with desiccation cooking vessels.

The primary object of the invention is to provide an efficient device for effecting complete condensation of steam generated in cooking vessels used in reducing meat, and bones to grease, meat scraps and tankage.

Another important object of the invention is to provide for eliminating odors emanating from such meat cooking vessels and for abstracting grease contained in the steam before the steam escapes into the surrounding atmosphere.

Another object of the invention is to provide in such devices for obviating back pressure in the cooker and obstruction to free flow of steam from the cooking vessel during the cooking operation.

A still further object of the invention is to achieve completely controlled condensation of steam generated at, and released from whatever source by being forced through a condenser in conjunction with water under pressure while at the same time effecting the complete condensation of such steam.

A further object is the production of distilled water by connecting a reservoir of distilled water and a pump in series with a condenser, thereby condensing the steam, converting it into distilled water as it is forced through the condenser under pressure with distilled water produced by itself and drawn from the reservoir by the pump which is connected in series with the condenser and reservoir.

An additional object of the invention is the provision of such a device which will be reliable and efficient in operation, sturdy and durable in construction, and relatively simple and inexpensive to manufacture and assemble.

Other objects reside in the combination of elements, and arrangements of parts pointed out hereinafter and shown in the accompanying drawings wherein there is disclosed a preferred embodiment of my invention.

In the drawings:

Figure 1 is a longitudinal vertical sectional view taken substantially along the center line of one form of device of the instant invention, or along the line 1—1 of Figure 2, as viewed in the direction indicated by the arrows.

Figure 2 is a top plan view of the device.

Figure 3 is a side elevational view of the device, partially broken away, as viewed from the left in Figure 1.

Figure 4 is a top plan view of the cap element of one of the chambers of the device.

Figure 5 is a sectional view taken substantially along the line 5—5 of Figure 4.

Figure 6 is a top plan view of the cap for the other element or chamber of the device.

Figure 7 is a sectional view taken substantially along the line 7—7 of Figure 6, as viewed in the direction indicated by the arrows.

Figure 8 is a top plan view of the base of one section of the device.

Figure 9 is a sectional view taken substantially along the line 9—9 of Figure 8.

Figure 10 is a top plan view of the base for the other chamber of the device.

Figure 11 is a sectional view taken substantially along the line 11—11 of Figure 10, as viewed in the direction indicated by the arrows.

Figure 12 is a top plan view of one of the intermediate sections of one of the towers.

Figure 13 is a sectional view taken substantially along the line 13—13 of Figure 12.

Figure 14 is a top plan view of one of the conical members.

Figure 15 is a bottom plan view of the same.

Figure 16 is a sectional view taken substantially along the line 16—16 of Figure 14, as viewed in the direction indicated by the arrows.

Similar reference characters refer to similar parts throughout the several views of the drawings.

Having reference to the drawings, and more particularly to Figure 1, it will be seen that the device of the instant invention is comprised of two towers generally indicated at 20 and 21, respectively. Referring first to the tower 20, it will be seen that the same is comprised of a base section 22, provided with a peripheral flange 23, in which is set a cylindrical tower section 24. The tower 20 is provided with a top member 25, provided with a flange 26 adapted to seat on the top of the tower section 24, and provided with an upwardly extending tube 27, having an aperture at its upper extremity adapted to be closed by a plug or cap 28, and provided with an outlet pipe 29. The interior of the tubular section 24 is provided with an inlet 30, from which gasses and fumes from the cooking vessels are permitted to enter the chamber, and is provided with an interiorly positioned baffle 31 of foraminous material, adapted to deflect solid matter to the base of the tube. A drainage plug 32 is provided in the lower extremity of the tower. Adjacent the upper extremity of the tower section 24 is a second baffle 33 adapted as a further trap for solids.

As best shown in Figure 2, the section 22 and member 25 are provided with flanges 34, through which extend bolts 35 holding the sections 20 and 22 and the member 25 in related assembly.

Having reference now to the tower 21, it will be seen that the same is comprised of a top section 40 including an upwardly extending tubular member 41, through which is adapted to extend a water inlet 42. The member 41 is provided with a laterally extending inlet pipe 43 connected as by a screw threaded collar 44 to the outlet pipe 29 of the section 27. The lower portion of the end cap 40 is provided with a flange 45 adapted to engage the upper rim of the top one of a plurality of intermediate sections generally indicated at 46. Section 46 will be more fully described hereinafter. The lowermost sections 46 rests on a base section 47, which, as best shown in Figures 8 and 9, includes an upper rim having a channel 48 therein to provide for a sealing gasket, and is provided with two outlets 50 and 51, the outlet 51 being provided with a plug 52 to permit clearance thereof, and the outlet 50 leading to a skimming vat not shown. Lugs 53 extending from the sections 47 and lugs 54 extending from the top section are connected as by bolts 55 to hold the sections 40, 46, 47 in related assembly.

Referring now in detail to the intermediate sections 46, it will be seen that each is comprised of a sleeve-like member 60, provided with a threaded outlet 61 (see Figure 13), and having a base plate 62 provided with bolt holes 63 therein which base plate has positioned therein a centrally disposed downtake tube 64 therein extending above and below the same. A bottom rim 65 on each section 46 fits in the next lower section. Bolts 66 extend through the bolt holes 63 and through spacer bushings 66' into bolt holes 68 in conical condensing members 67 and together with said bushings 66' secure the conical members to the base plates 62 in spaced relation thereto and above the same. Conical members 67 have interiorly thereof toroidal recesses 69 adapted to overlie the upper ends of the downtake tubes 64.

Any desired number of sections 46 may be utilized in the tower 21 to accommodate the same to the height of the tower 24.

From the foregoing the operation of the device should now be readily understandable. Steam carrying grease and other materials is introduced into the tower 20 through the opening 30 which may be connected in any suitable manner to cooking vessels, not shown, to receive steam therefrom. The ascending steam passes through the baffles 31, and a certain quantity of the grease in the space between the baffles 31 and 33. Steam then passes through the tube 27, outlet pipe 29, inlet pipe 43 and member 41 downwardly into the tower 21, in the direction indicated by the arrows, surrounds the conical member 67 and passes beneath the same into the toroidal recesses 69, and then through the downtake tubes 64. Simultaneously a stream of water is fed through the pipe 42, which serves to cool and concentrate the steam, and wash the same downwardly. It may here be pointed out that suitable drainage plugs 70 are provided in each of the sections 46 engaging in the threaded aperture 61.

After the washing and cooling operation has been completed and the now cooled steam has condensed into distilled water together with what remaining grease is contained therein, the fluid material enters the bottom section 47 and is carried through the outlet 50 into skimming vats (not shown), where the remainder of the grease may be skimmed from the fluid remaining in the residue of the process.

Obviously, if desired, the distilled water so formed may be recirculated through the apparatus.

From the foregoing it will now be seen that there is herein provided a construction which completely deodorizes the steam escaping from the cooking vessels or the like, and condenses all the grease carried thereby in such manner that the same is readily recovered, and which accomplishes all the objects of this invention and others resulting in many advantages of great practical utility and commercial importance.

It is to be understood that all matter herein is to be interpreted merely as illustrative and not in a limiting sense and that modifications of the invention may be resorted to within the scope of the appended claims.

I claim:

1. In an apparatus of the class described, a steam tower having a bottom inlet and a top outlet and adapted for receiving therein through said inlet steam carrying solid matter therewith, means in said steam tower above said inlet for baffling steam arising in said tower and deflecting the solid matter toward the bottom of said tower, a condensing tower alongside the steam tower communicating at the top thereof with the outlet of said steam tower, vertically spaced diametrical plates in said condensing tower, conical solid condensing members in said condensing tower surmounting said plates in vertically aligned relation and spaced above said plates to provide for steam entering between the same and said plates, downtake tubes in said plates discharging onto subjacent condensing members and aligned vertically with the apices thereof, and means to introduce cooling water into the top of the condensing tower onto the uppermost condensing member.

2. In an apparatus of the class described, a steam tower having a bottom inlet and a top outlet and adapted for receiving therein through said inlet steam carrying solid matter therewith, means in said steam tower above said inlet for baffling steam arising in said tower and deflecting the solid matter toward the bottom of said tower, a condensing tower alongside the steam tower communicating at the top thereof with the outlet of said steam tower, vertically spaced diametrical plates in said condensing tower, conical solid condensing members in said condensing tower surmounting said plates in vertically aligned relation and spaced above said plates to provide for steam entering between the same and said plates, downtake tubes in said plates discharging onto subjacent condensing members and aligned vertically with the apices thereof, and means to introduce cooling water into the top of the condensing tower onto the uppermost condensing member, said condensing members having toroidal bottom recesses therein for pocketing the steam to facilitate condensing the same.

3. In an apparatus of the class described, a steam tower having a bottom inlet and a top outlet and adapted for receiving therein through said inlet steam carrying solid matter therewith, means in said steam tower above said inlet for baffling steam arising in said tower and deflecting the solid matter toward the bottom of said tower, a condensing tower alongside the steam tower communicating at the top thereof with the outlet of said steam tower, vertically spaced diametrical plates in said condensing tower, conical solid condensing members in said condensing tower surmounting said plates in vertically aligned relation and spaced above said plates to provide for steam entering between the same and said plates, downtake tubes in said plates discharging onto subjacent condensing members and aligned vertically with the apices thereof, and means to introduce cooling water into the top of the condensing tower onto the uppermost condensing member, said condensing members having toroidal bottom recesses therein for pocketing the steam to facilitate condensing the same, said downtake tubes extending into the said recesses to provide a tortuous escape path for the steam passing from said recesses into said tubes.

GEORGE D. MOODY.

REFERENCES CITED

The following references are of record in the file of this patent:

UNITED STATES PATENTS

| Number | Name | Date |
|---|---|---|
| 1,155,237 | Hofman | Sept. 28, 1915 |
| 2,016,549 | Kenna et al. | Oct. 8, 1935 |

FOREIGN PATENTS

| Number | Country | Date |
|---|---|---|
| 153,475 | Germany | Apr. 15, 1917 |